United States Patent [19]

Bliss

[11] Patent Number: 4,765,487
[45] Date of Patent: Aug. 23, 1988

[54] AUTOMATIC ARTICLE STACKING SYSTEM

[75] Inventor: George N. Bliss, Franklin, Mich.

[73] Assignee: Diamond Automations, Inc., Farmington Hills, Mich.

[21] Appl. No.: 891,907

[22] Filed: Jul. 30, 1986

[51] Int. Cl.$^4$ .......................... B07C 5/38; B65G 57/30
[52] U.S. Cl. ........................................ 209/510; 53/53;
198/347; 209/552; 209/914; 209/925; 414/65;
414/67; 414/96; 414/906
[58] Field of Search ........................ 414/31, 62, 63, 65,
414/67, 95, 96, 906; 53/53, 541; 209/509, 510,
535, 536, 552, 586, 606, 914, 925; 198/347

[56] References Cited

U.S. PATENT DOCUMENTS

| | | | |
|---|---|---|---|
| 2,970,708 | 2/1961 | Watanabe et al. | 414/96 X |
| 3,434,603 | 3/1969 | Horman | 414/66 |
| 3,509,995 | 5/1970 | Colaw | 53/53 X |
| 3,576,255 | 4/1971 | Warren | 209/606 X |
| 3,763,625 | 10/1973 | Slavin et al. | 414/96 X |
| 4,245,940 | 1/1981 | Luther et al. | 414/95 |
| 4,655,663 | 4/1987 | Rosati | 414/96 X |

Primary Examiner—Leslie J. Paperner
Attorney, Agent, or Firm—Kenyon & Kenyon

[57] ABSTRACT

An automatic article stacking system wherein a plurality of articles to be stacked are arranged in layers prior to being stacked. The layers are advantageously arranged horizontally orthogonal to one another so as to enhance the stability of the stack. A measurement system is provided for determining whether any of the articles exceeds a predetermined size limit. In one embodiment which is arranged for stacking egg cartons, a determination that the egg carton exceeds the predetermined size limit signifies that the egg carton is open and, therefore, not in a form suitable for stacking. The open egg carton is conveyed under an elevator which accumulates the articles to be stacked, and to a discharge area. Thus, closed egg cartons are accumulated in layers and stacked. Successive layers of articles are stacked under prior stacked layers.

35 Claims, 14 Drawing Sheets

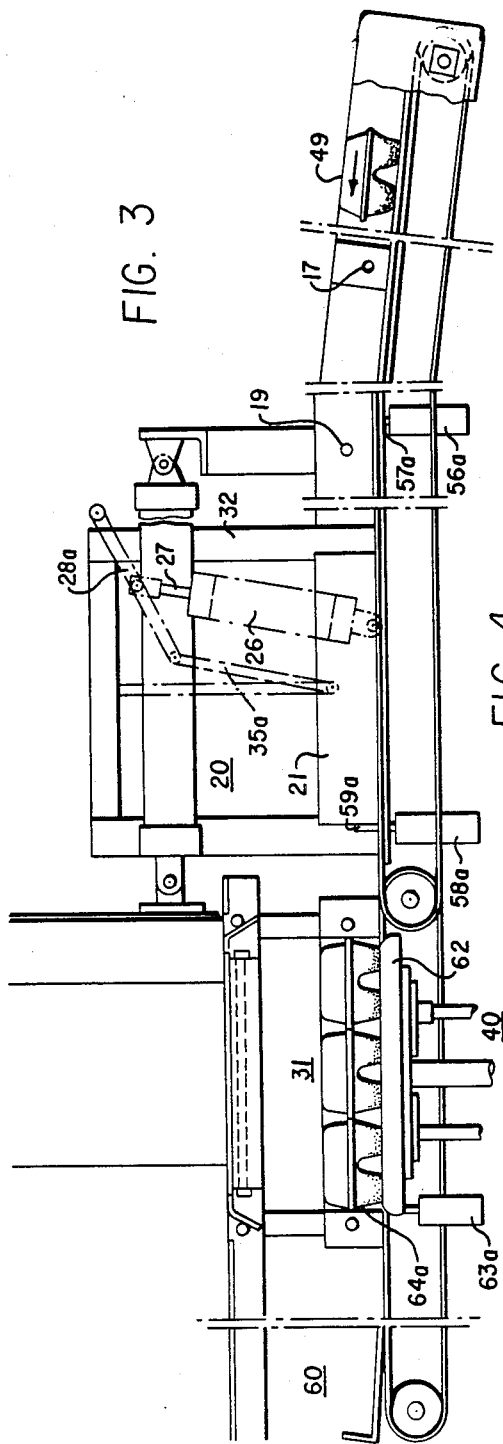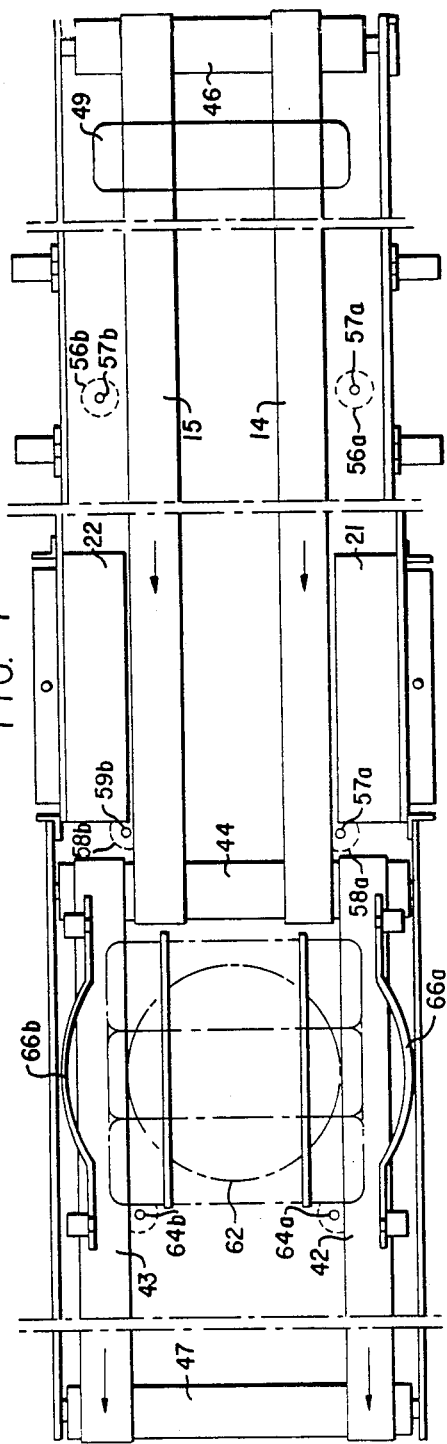

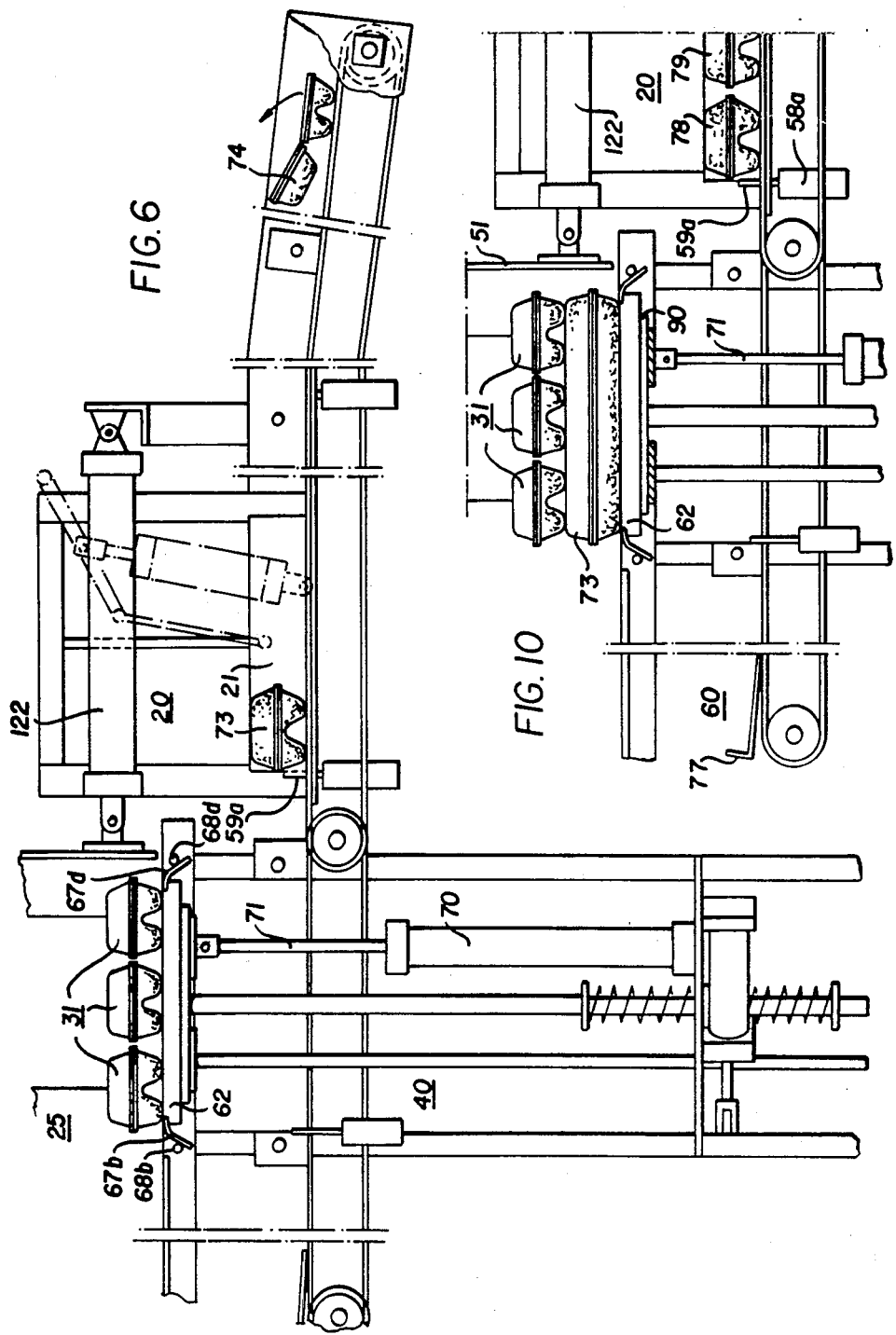

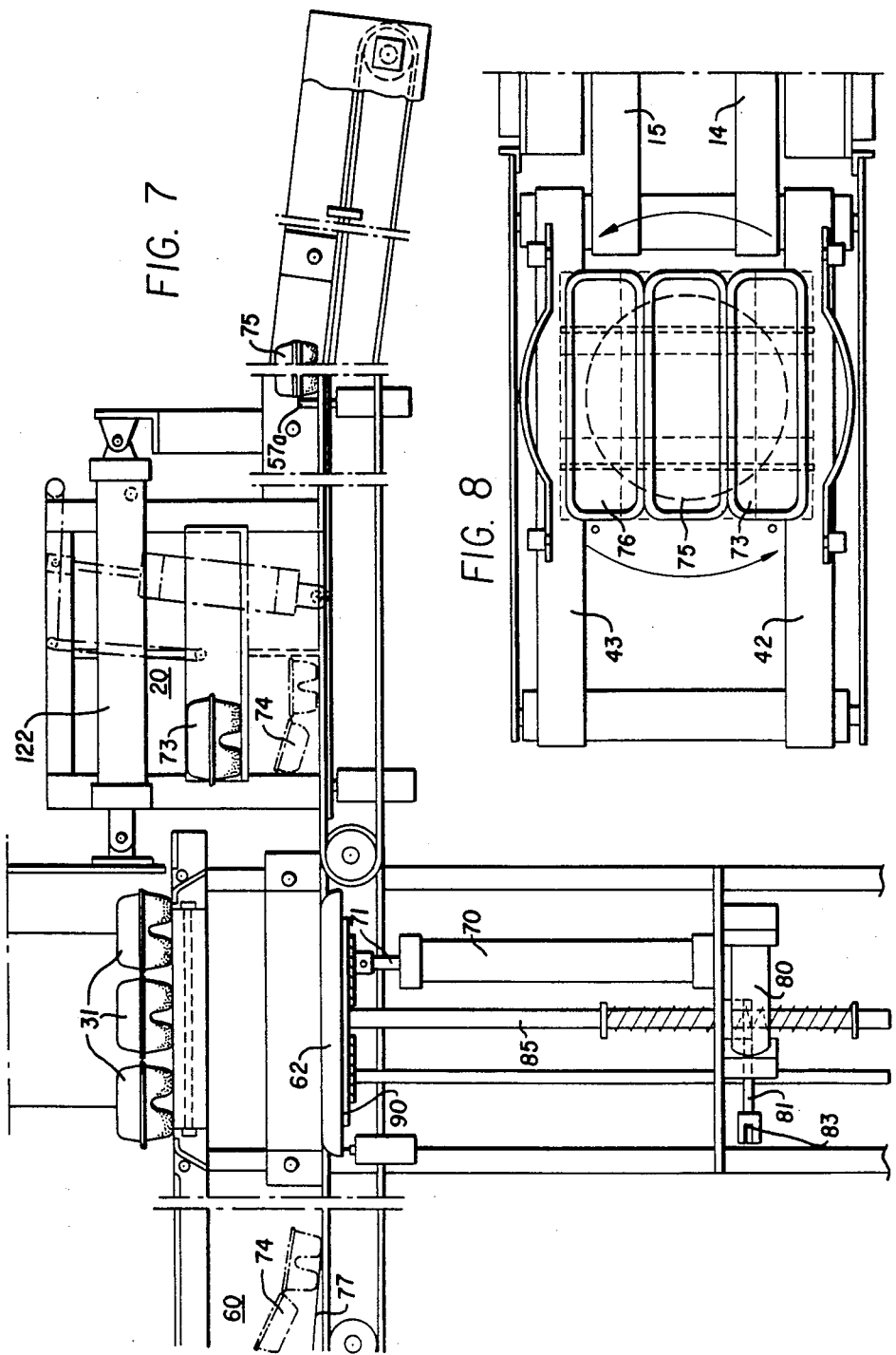

AUTOMATIC ARTICLE STACKING SYSTEM

BACKGROUND OF THE INVENTION

This invention relates to systems for packing cartons into containers or cases, and more particularly, to a machine and process for stacking and loading articles such as egg cartons or trays into shipping containers.

Processing and packaging of eggs has become highly automated over recent years, with many functions which were accomplished manually now being performed either completely or partially automatically. Associated with this change are the high speeds attained in the various processing steps including, washing, grading and packaging of the eggs into individual cartons. The egg cartons, once filled with eggs are then ready for shipment to, for instance, a supermarket.

In this regard, it is conventional for the egg cartons to be stacked three abreast with each layer being rotated with respect to the adjacent layer or layers. The cartons thus arranged are placed into a shipping container, the stack of cartons generally including six layers or rows. A shipping container is thus provided with eighteen cartons of eggs.

With the high speeds attained in egg processing, a great deal of manual effort is expended in stacking and filling the shipping container. While stacking and unstacking machines have been developed, the industry, to a large extent, continues to perform this function manually.

A prior art container loading machine is disclosed in U.S. Pat. No. 4,104,846. A system is provided by which the egg cartons are conveyed to a loading zone and subsequently to a discharge carriage. In this system, successive layers of egg cartons are stacked by loading subsequently higher layers of egg cartons upon lower layers, each of which is lowered by rods a predetermined distance. Thus, a complex mechanism is provided for arranging a first egg carton layer which is lowered by a predetermined uniform amount which corresponds precisely to the height of an egg carton, before each subsequent layer of egg cartons is placed thereon.

An object of this invention is to provide an improved case packing system of the above-described type.

Another, more particular object of this invention is to provide such an improved case packing system which is adapted to receive egg cartons or trays travelling on a conveyor belt and to lift a stack of such egg cartons or trays into a container.

A further particular object of this invention is to provide a system whereby layers of articles to be stacked can be arranged in several possible configurations having predetermined angular relationships with respect to one another.

It is a still further object of this invention to provide a case packing system which recognizes the articles to be stacked and provides a selection between acceptable and unacceptable articles to be packed.

SUMMARY OF THE INVENTION

The foregoing and other objects are achieved by this invention which provides a system for stacking a plurality of articles in a predetermined stacking configuration. A conveyor is provided for moving the articles to be stacked along a conveyor path. At least one photoelectric sensing device is arranged near the conveyor path to detect the presence of the articles on the conveyor, and produce signals which correspond to the presence of each article. The photoelectric presence signal is combined with a conveyor travel signal responsive to the distance traveled by the conveyor to produce a signal corresponding to the length of each article.

A predetermined number of articles are contiguously collected in an elevator, so as to form a layer of articles to be stacked. If the photoelectric sensing device detects the presence of an article on the conveyor which has a length which does not conform to predetermined size limits, the elevator is raised so as to permit the nonconforming article to be conveyed thereunder. Thus, articles which do not conform to predetermined size limits are not accumulated in the elevator for subsequent stacking. After the nonconforming article has been conveyed to a discharge area, the elevator is returned to its original position where it accumulates further articles to complete a layer, if necessary. The layer of articles is conveyed from the elevator to a rotation table which may be rotated to achieve a desired angular orientation of the layer.

The rotation table and the layer are subsequently raised so that the layer is brought in contact with and held by a holding mechanism in a stacking zone, each such subsequent layer becoming a lowermost layer of articles with respect to prior stacked layers. Thus, each new layer is introduced at the bottom of the stack.

In one specific illustrative embodiment of the invention which relates to the stacking of egg cartons, each of the egg cartons on the conveyor is initially arranged so as to have its longest axis disposed transverse to the direction of travel of the conveyor. Three such egg cartons are collected in the elevator so as to form a layer which is then released and conveyed to the rotation table. In this embodiment, adjacent layers of egg cartons are stacked under one another in the stacking zone and are arranged orthogonal to one another by operation of the rotation table. Such an orthogonal relationship between the layers enhances the stability of the stack.

After a predetermined number of layers of articles have been stacked in the stacking location, the stacked articles are moved to an unloading area. In one embodiment, the stacked articles are moved from the stacking location to the unloading area by a mechanical system which applies a lateral force to the stack. It is noted, the stacked articles may be removed from the unloading area by a further conveyor system, an unloading crane, or any other known manner.

BRIEF SUMMARY OF THE INVENTION

Comprehension of the invention is facilitated by reading the following detailed description in conjunction with the annexed drawings in which:

FIG. 3 is a front view of a primary conveyor system showing the manner in which egg cartons are supplied to the elevator and the rotation table;

FIG. 4 is a plan view showing the mechanical relationship between the primary and secondary conveyors, the elevator, and the rotation table;

Figure 11:
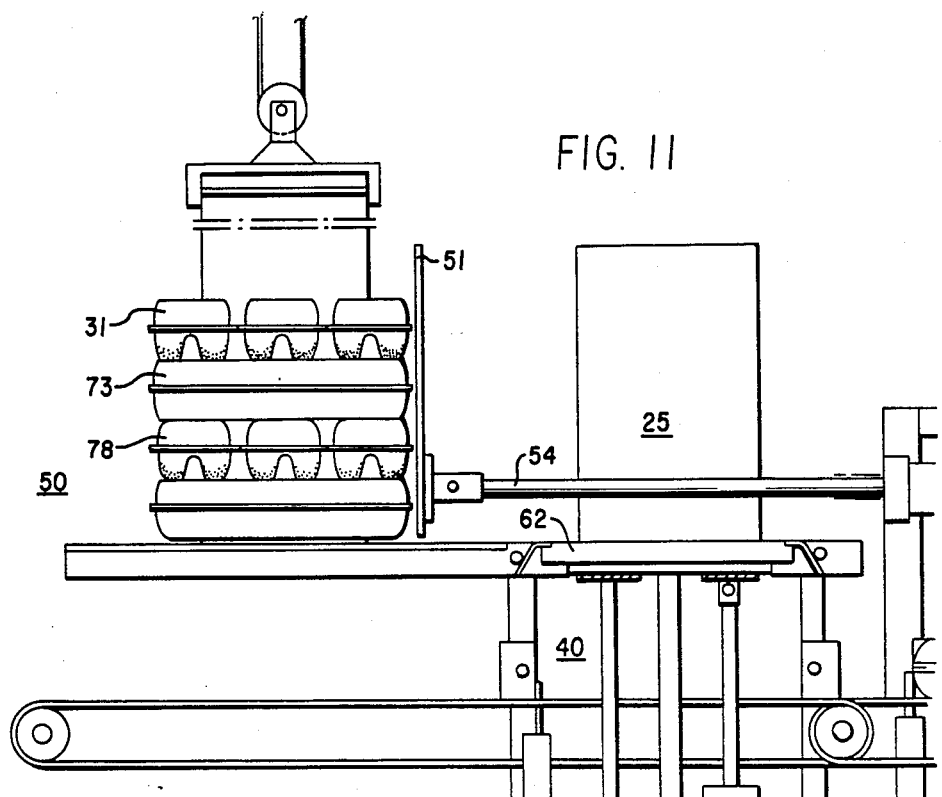
Figure 9:
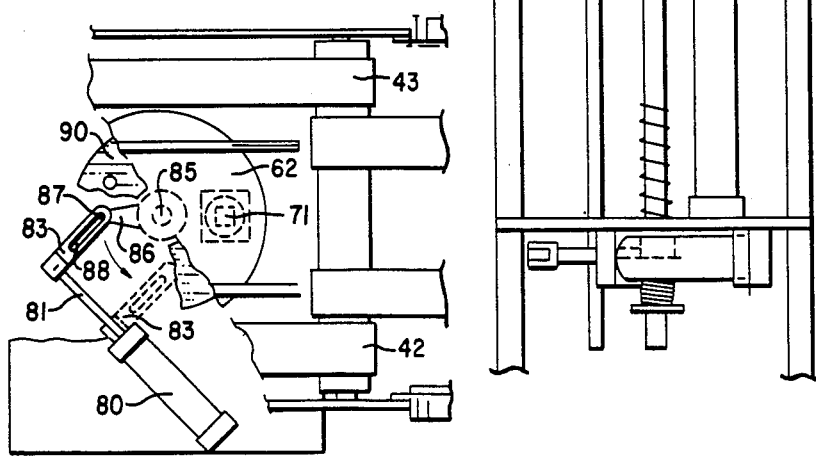
Figure 12:
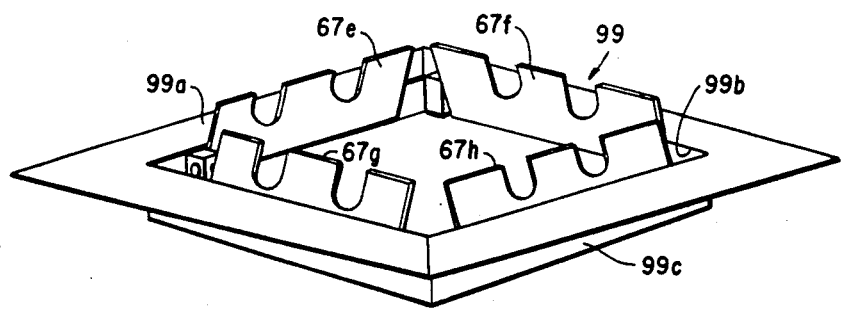

FIGS. 6 and 7, taken together, illustrate the manner in which a nonconforming article, such as an open egg carton, is bypassed under elevator to a discharge zone;

FIG. 8 is a plan view of the rotation table showing the manner in which the rotation table rotates so as to achieve desired angular orientation of each layer of articles;

FIG. 9 is a fragmented view of a rotation actuation mechanism for rotatively moving the rotation table;

FIG. 10 is a front view of the rotation table illustrating the manner in which the rotation table is raised so as to stack the layers of egg cartons under one another;

FIG. 11 is a front view of the unloading zone of the invention showing the manner in which stacked articles are moved from the stacking zone;

FIG. 12 is a perspective view of a frame installable at the stacking zone for enabling the stacking of strays each carrying 30 eggs.

Figure 13:
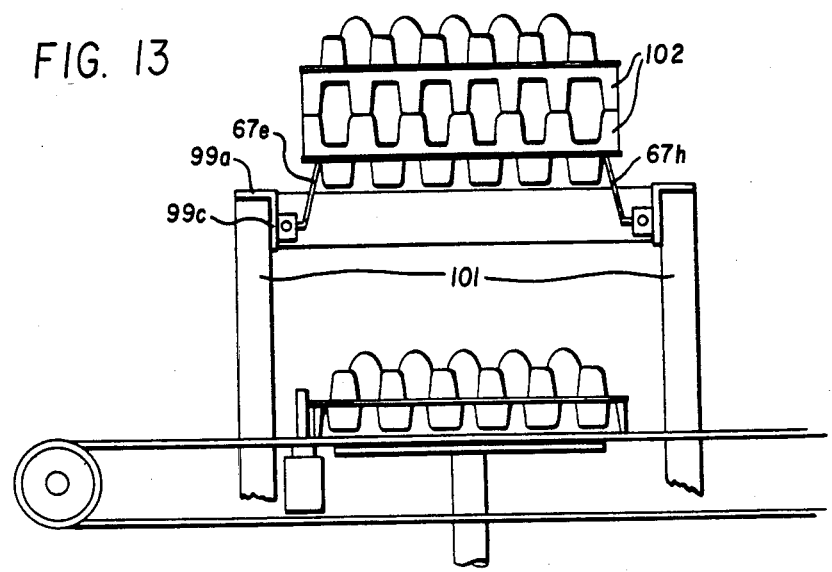

FIG. 13 is a side elevational view of the stacking station, showing the frame of FIG. 12 resting on upright supports above the rotation table.

Figure 14:
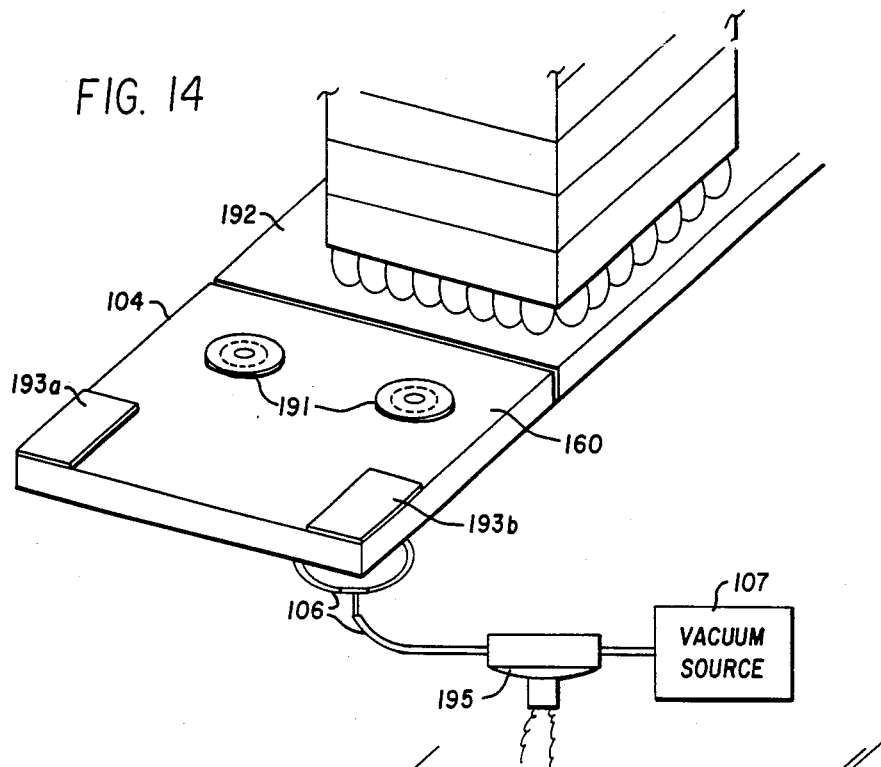

FIG. 14 is a partial perspective view of a discharge shelf at the unloading zone, for use in a method for removing stacked articles from the stacking zone.

Figure 15:
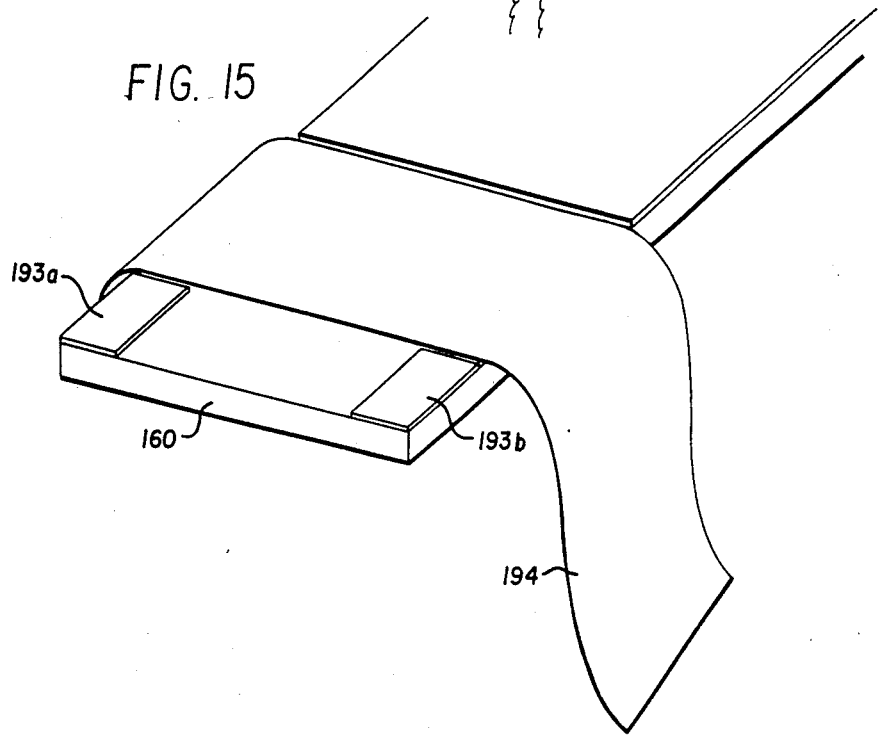

FIG. 15 is a partial perspective view similar to FIG. 14, illustrating a plastic strip disposed on the discharge shelf for receiving a stack of articles.

Figure 16:
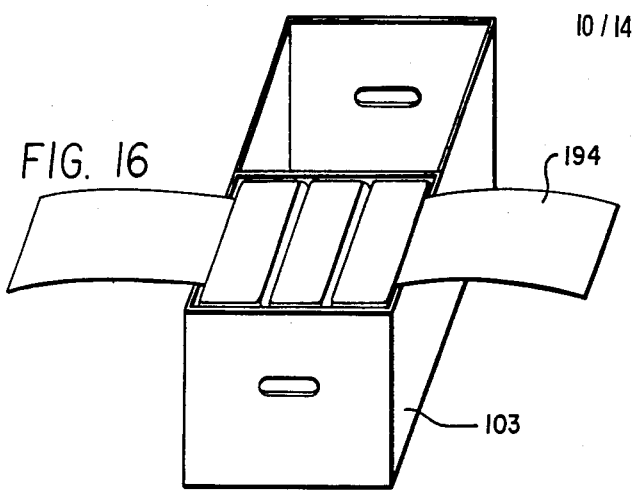

FIG. 16 is a perspective view of a container in which a stack of egg cartons has been placed by means of the plastic strip illustrated in FIG. 15.

Figure 17:
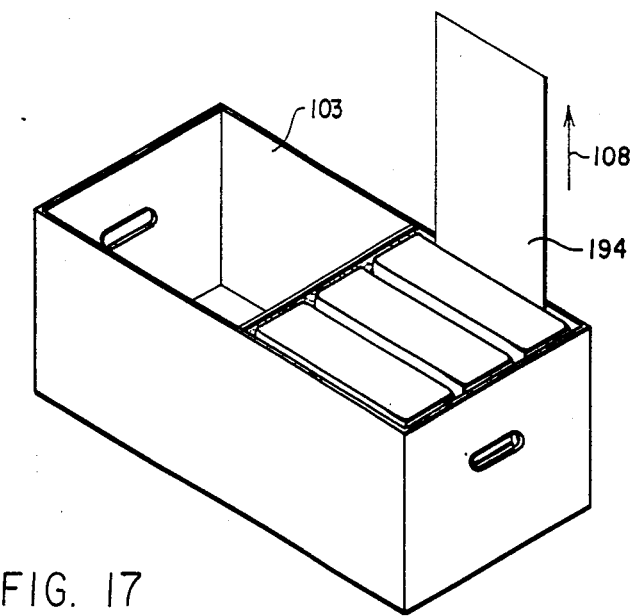

FIG. 17 is a perspective view of the container and stack of cartons shown in FIG. 16, showing the manner of removing the plastic strip from the container.

Figure 18:
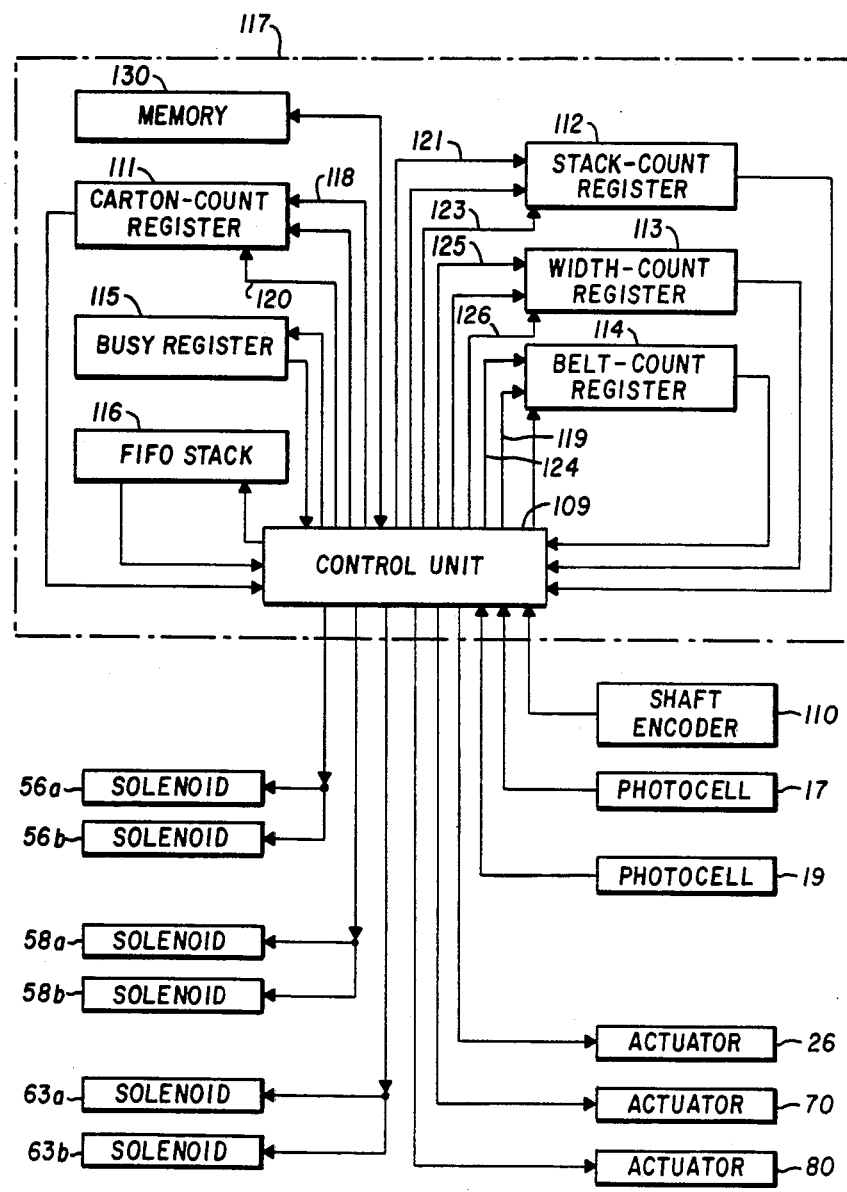

FIG. 18 is a block diagram of a control circuit for timing the energization of solenoids and actuators in response to inputs from photocells and a shaft encoder.

Figure 19A:
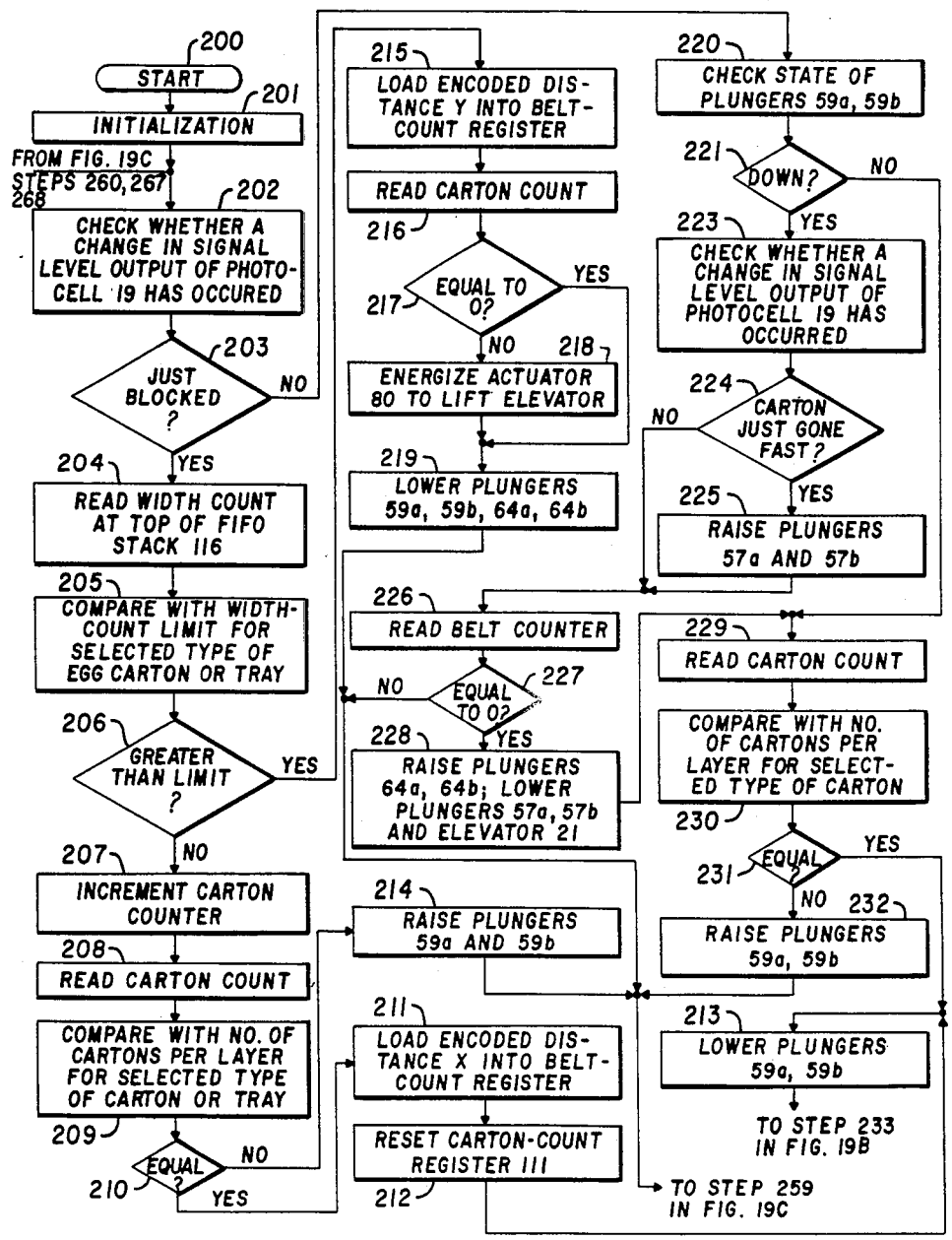
Figure 19B:
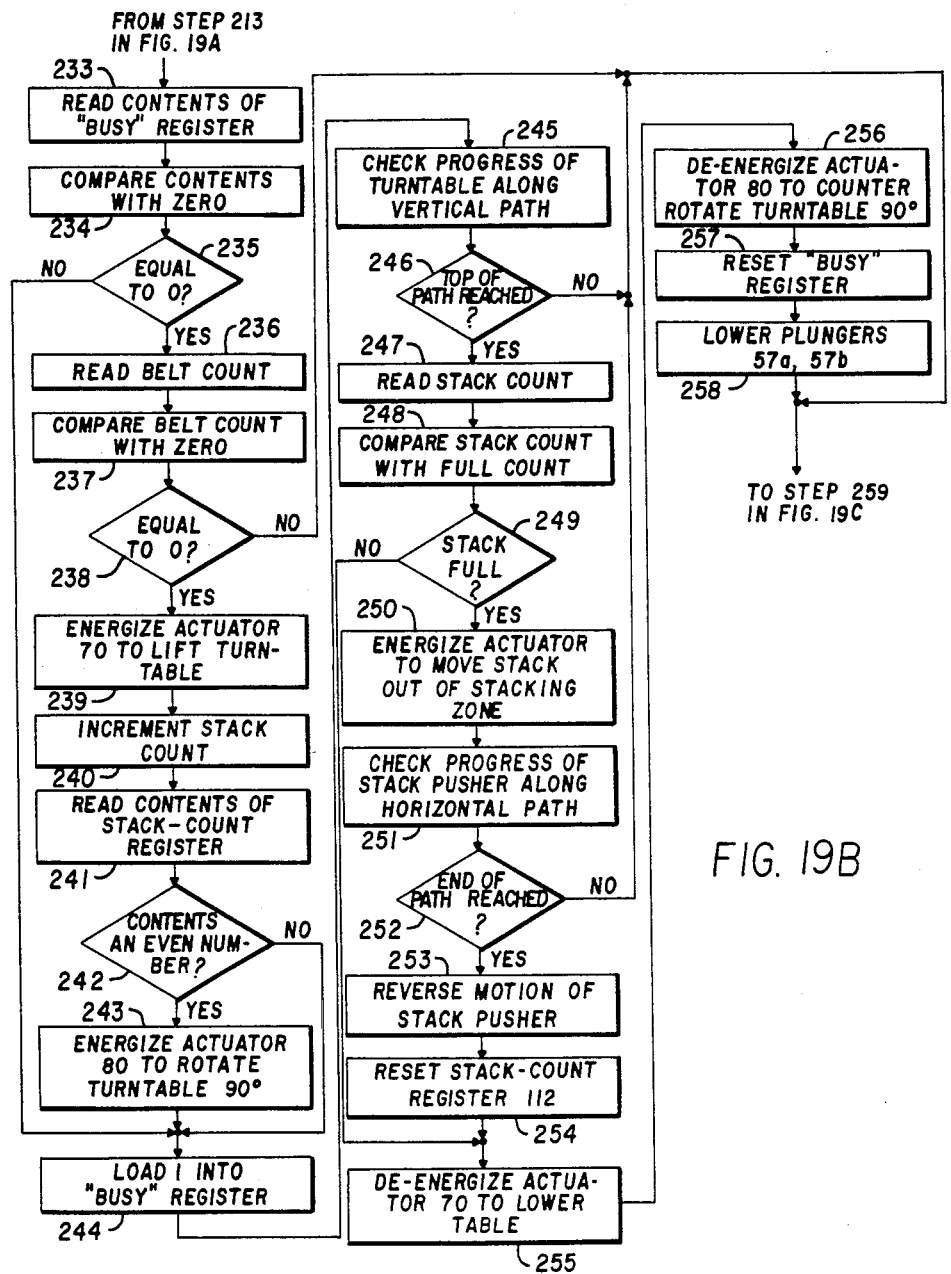
Figure 19C:
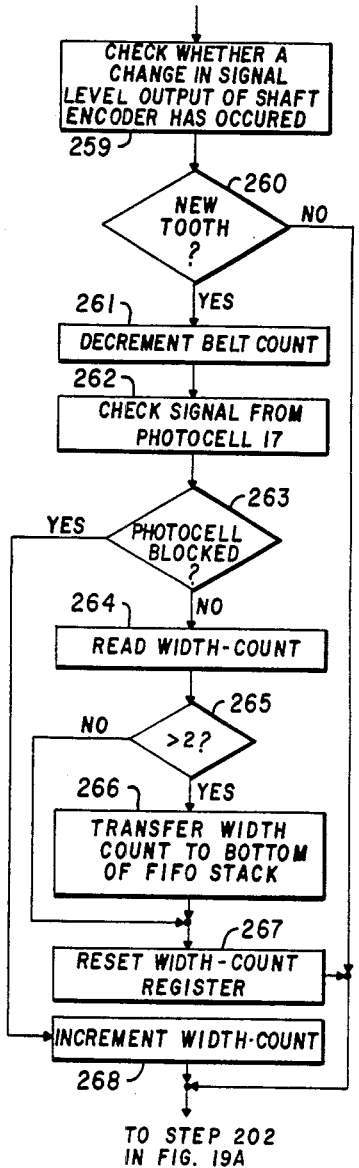

FIGS. 19A and 19B and 19C are a flow chart diagram illustrating a sequence of steps in the operation of the control circuit illustrated in FIG. 18.

DETAILED DESCRIPTION

Figure 1:
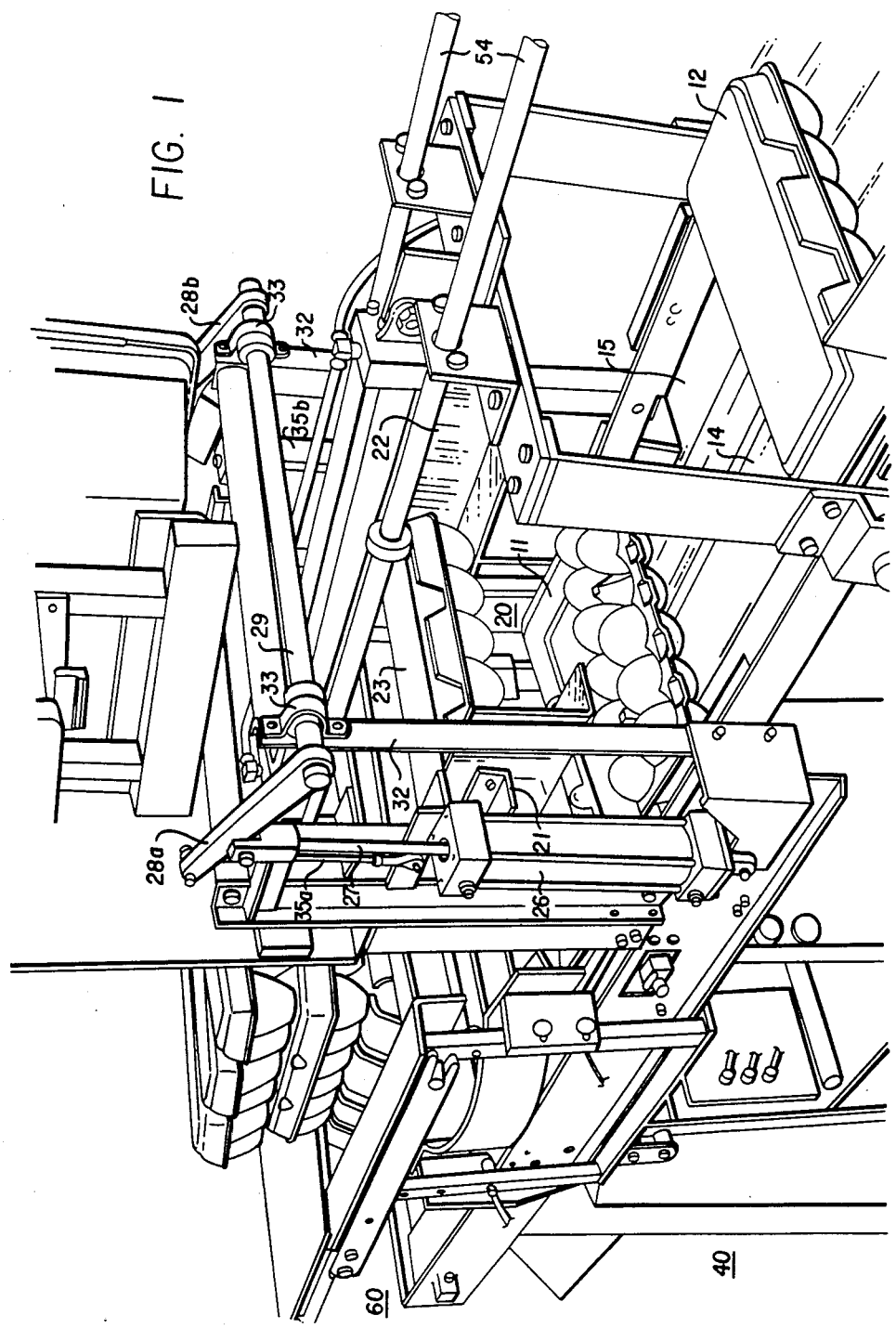
FIG. 1 is a perspective view of a mechanical stacking system constructed in accordance with the principles of the invention.

FIG. 1 shows an isometric perspective view of a specific illustrative embodiment of an automatic article stacking system which stacks egg cartons or trays. A plurality of egg cartons or trays, such as egg cartons 11 and 12 are conveyed for stacking by a conveyor formed of parallel belts 14 and 15. As the egg cartons are conveyed along the conveyor, a photoelectric device 17 (not shown in this figure), which is mounted on a stationary member of the machine, detects the presence of each egg carton as it passes near the location of the photoelectric device. The presence signal produced by the photoelectric device can be combined with a distance signal from further circuitry which measures the distance traveled by an article on the conveyor so as to produce a measurement signal responsive to the length of the article along a dimension parallel to the direction of travel of the conveyor. As discussed in detail hereinafter, the measurement signal may be a count from a register or counter, whose contents are incremented, if the presence signal from the photoelectric device is nonzero, by a stepping signal generated during motion of conveyor belts 14 and 15.

Preferably, the article stacking system is further provided with an elevator 20 having two L-shaped lifting structures 21 and 22 which are arranged symmetrically with respect to one another. The elevator is provided particularly to facilitate the stacking of egg cartons. A stacking machine in accordance with the invention need not include elevator 20 if the stacking machine is intended solely for the stacking of egg trays.

FIG. 1 shows the L-shaped elevator structures 21 and 22 in an elevated position and holding an egg carton 23. As indicated, photoelectric device 17 operates in combination with the above-mentioned conveyor travel monitoring circuitry to provide a distance measurement signal corresponding to the length of egg carton 11 along the direction of conveyor travel. Since, as shown in the figure, egg carton 11 is open, a signal is produced which indicates that the length of egg carton 11 exceeds a predetermined threshold limit. Such an excessive length signifies that egg carton 11 is open and therefore not in a form suitable for stacking. Accordingly, a bypass signal is generated which causes elevator 20 to be lifted thereby permitting egg carton 11 to pass thereunder.

Figure 2:
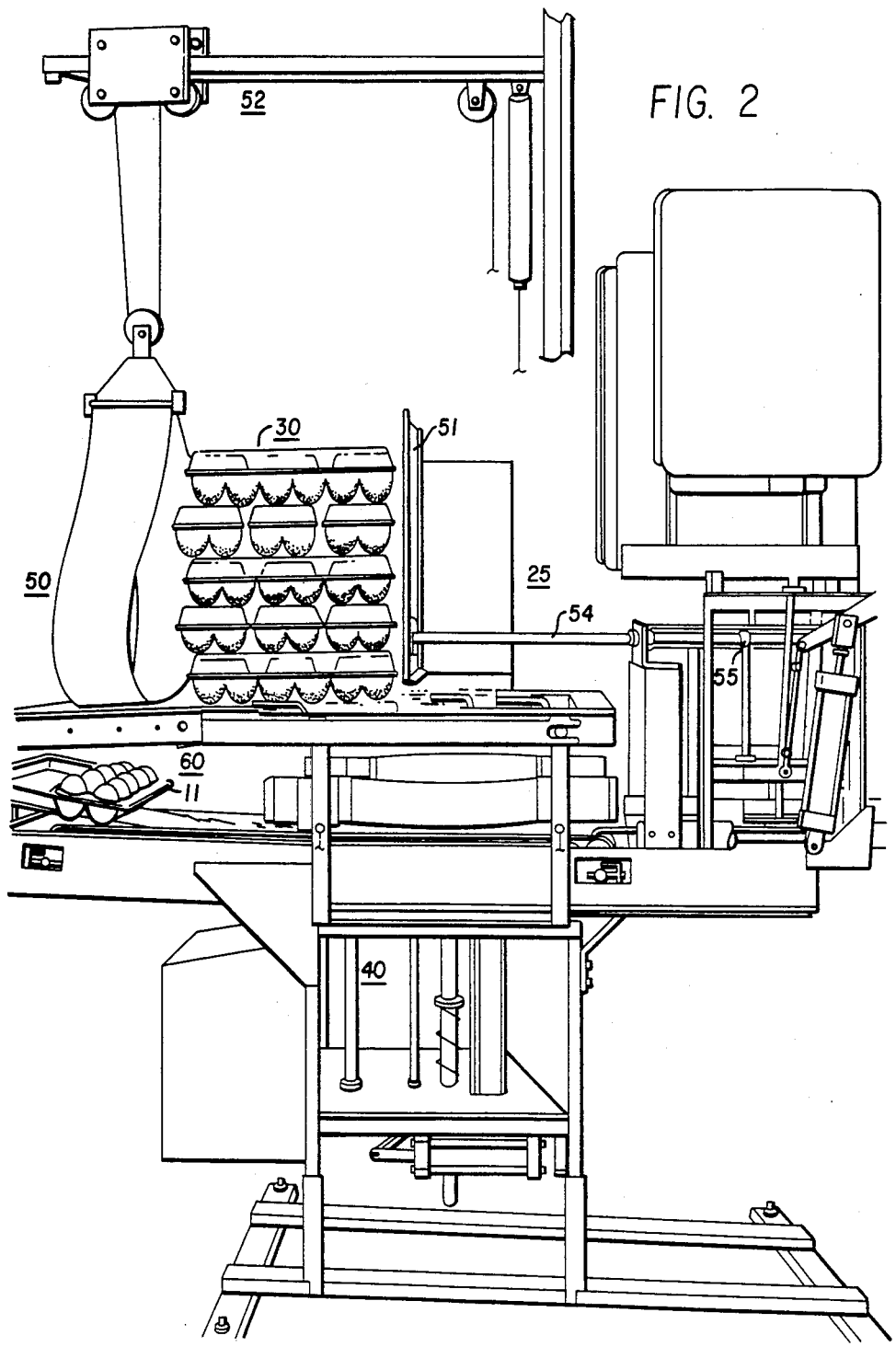
FIG. 2 is a front perspective view of the embodiment of FIG. 1 showing the operation of a mechanism for unloading the stacked articles from the stacking zone.

FIG. 2 shows open egg carton 11 which, after having been conveyed under elevator 20 and past a rotation table assembly 40, is delivered to a discharge zone 60. FIG. 2 further shows a completed stack of egg cartons 30 in the process of being moved from a stacking zone 25, which is located directly above rotation table assembly 40 to an unloading zone 50. In this embodiment, egg carton stack 30 is pushed from stacking zone 25 to unloading zone 50 by operation of an unloading plate 51 which is actuated by mechanisms which will be discussed hereinbelow. In this particular illustrative embodiment, the unloading of egg carton stack 30 from unloading zone 50 is achieved by a crane assembly 52 having a loading sling 53. However, other unloading arrangements, such as the alternative arrangement illustrated in FIGS. 14-17, may be provided by persons skilled in the art without departing from the scope of the invention.

FIG. 3 is a simplified lateral plan view of the article stacking system showing elevator 20 in a lowered position. Elevator 20 is raised and lowered by an actuation mechanism 26 which may be hydraulically operated. It should be noted, however, that any other type of actuation mechanism, such as mechanisms which are operated pneumatically, mechanically, or electromechanically, may be devised by persons skilled in the art. Referring to FIGS. 1 and 3, actuation mechanism 26 is shown to have an armature 27 which is slidably engaged within the body of actuation mechanism 26. The distal end of armature 27 is pivotally coupled at an intermediate portion of a lever arm 28a. Lever arm 28a is mechanically coupled at one end thereof to an axle bar 29 which is rotatively attached to frame members 32 of the machine by a pair of journal bearings 33. Axle bar 29 is mechanically connected at its other end to a second lever arm 28b. Lever arms 28a and 28b are pivotally coupled at their ends which are distal from axle bar 29, to elevator lift rods 35a and 35b, respectively, which couple the lever arms to L-shaped elevator lift members 21 and 22. Thus, in this embodiment, the application of an hydraulic signal to actuation mechanism 26 causes armature 27 to raise lever arm 28a, thereby also raising lever arm 28b by operation of axle bar 29. The raising of lever arms 28a and 28b causes L-shaped elevator lift members 21 and 22 to be lifted as a result of the tensile forces on elevator lift rods 35a and 35b.

As previously noted, parallel conveyor belts 14 and 15 convey the egg cartons either onto or past elevator 20, depending upon whether elevator 20 is in a lowered or raised position. FIG. 4 shows the relationship between primary conveyor belts 14 and 15, and a pair of secondary conveyor belts 42 and 43. The primary and secondary belts are coupled to one another at a common shaft 44 so as to move simultaneously. Primary conveyor belts 14 and 15 are arranged at one end around common shaft 44, and at their other end around a primary conveyor shaft 46. Secondary conveyor belts 42 and 43 are arranged around common shaft 44, outward of primary conveyor belts 14 and 15, and a secondary conveyor shaft 47. Shafts 44, 46 and 47 are rotated in a conventional manner so as to cause the primary and secondary conveyor belts to travel in the direction indicated by the arrows, when viewed from the top of the machine.

Since all of the conveyor belts travel simultaneously as all of the shafts rotate, the above-mentioned conveyor travel signal may be produced by coupling an encoder 110 (FIG. 18) of a known type to any of the conveyor shafts. As discussed hereinafter with respect to FIGS. 19A–19C, a conveyor travel signal derived from a pulse train at an output of the shaft encoder is combined with the presence signal from photoelectric device 17 to produce a distance measurement count signal which corresponds to the length of each egg carton along the direction of conveyor travel.

Referring to FIGS. 3 and 4, an egg carton 49 is placed on the primary conveyor belts so as to travel in the direction of the arrows, from right to left. During its travel, egg carton 49 passes near photoelectric device 17 and a pair of solenoids 56a and 56b. Solenoids 56a and 56b are each provided with a respective solenoid armature or plunger 57a and 57b, which armatures are shown in a lowered position. When energized, these solenoids extend their armatures to prevent a closed egg carton from being conveyed with conveyor belts 14 and 15, while an open egg carton is conveyed under elevator 20 to discharge zone 60. During normal operation, however, solenoid armatures 57a and 57b are in a lowered position, as shown, so as to permit the egg cartons to be conveyed onto elevator 20. The passage of the egg cartons beyond solenoid armatures 57a and 57b is detected by a photoelectric device 19. The egg cartons are prevented from being conveyed past the elevator by a pair of solenoids 58a and 58b, which are each provided with a respective one of solenoid armatures or plungers 59a and 59b. Solenoid armatures 59a and 59b are shown in FIG. 3 in an extended position.

After a predetermined number of egg cartons are accumulated over L-shaped elevator structures 21 and 22, solenoid armatures 59a and 59b are drawn downward into their respective solenoids to permit the three egg cartons, which form a layer of articles to be stacked, to be conveyed onto the secondary conveyor belts and onto turntable 62. The egg cartons are retained over the turntable by solenoids 63a and 63b, which have respective solenoid armatures or plungers 64a and 64b both in an upwardly extended position to prevent the egg cartons from being conveyed beyond turntable 62.

Figure 5:
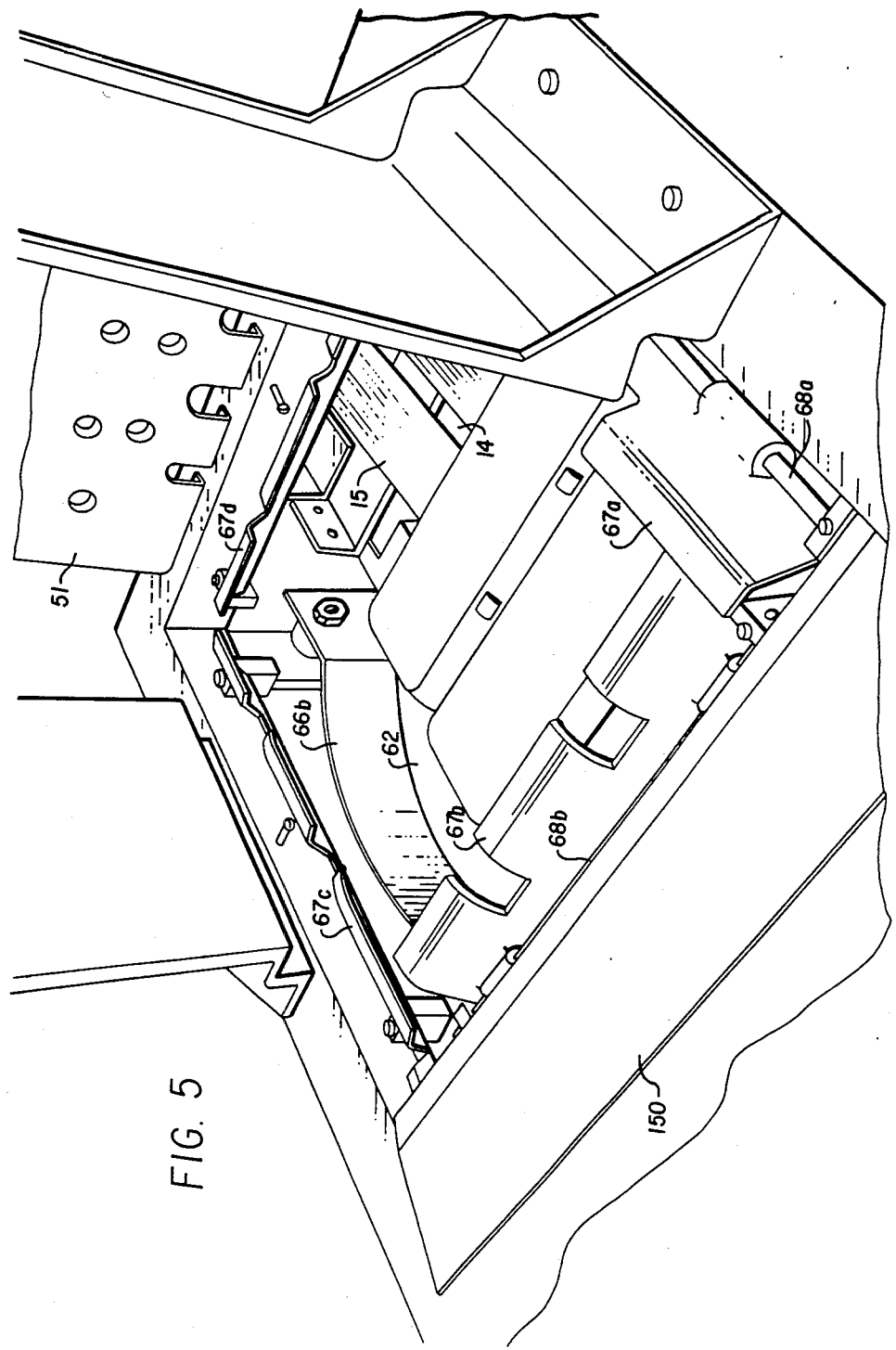
FIG. 5 is a perspective view of the rotation table under the stacking zone.

FIG. 5 shows an isometric perspective representation of turntable 62 having three egg cartons thereon, as viewed from the stacking zone. As shown in FIGS. 4 and 5, turntable 62 is partially surrounded by a pair of curved shields 66a and 66b which prevent damage to, and disorientation of, the egg cartons when the turntable is rotated. Four hinged layer holders, 67a, 67b, 67c and 67d, are arranged at the bottom of the stacking zone, immediately above turntable 62. Each such layer holder is pivotally coupled to a rectangular frame 150 by a respective one of hinge pins 68a, 68b, 68c and 68d. As described hereinafter with reference to FIGS. 12 and 13, frame 150 is removably mounted to the stationary structure of the machine.

FIG. 6 shows rotation table assembly 40 in an elevated position so that the upper surface of turntable 62 is at the same level as the stacking zone 25. Rotation table 62 is elevated by operation of an actuation mechanism 70. In this embodiment, actuation mechanism 70 is provided with an armature 71 which is slidably engaged within the actuation mechanism. Actuation mechanism 70 may be of a pneumatic, hydraulic, mechanical, or electromechanical type. As shown in the figure, the operation of actuation mechanism 70 causes armature 71 to rise, thereby raising rotation table 62 in a manner which will be discussed below in detail. The egg cartons are consequently raised above the level of layer holders 67a through 67d which, as a result of their pivotal coupling with hinge bars 68a through 68d, hold the egg cartons so as to prevent them from returning to the lowered position when the rotation table is lowered. This figure shows a closed egg carton 73 which is held in position on elevator 20 by raised solenoid armature 59a. Solenoid armature 59b (not shown in this figure) is also in a raised position. A subsequent egg carton 74 is shown to be opened.

FIG. 7 shows rotation table 62 returned to a lowered position by operation of actuation mechanism 70. In this figure, however, elevator 20 and egg carton 73 are shown in a raised position so as to permit opened egg carton 74 to pass thereunder. A subsequent egg carton 75, which is closed, is shown on the primary conveyor belts and will be prevented from being conveyed under elevator 20 by extended solenoid armatures 57a and 57b. Open egg carton 74 is shown (in phantom) being conveyed under elevated elevator 20. The open egg carton is subsequently conveyed over rotation table 62 until it is conveyed onto a discharge ramp 77 in discharge zone 60.

FIG. 8 is a plan view of rotation table assembly 40, viewed from above. The rotation table has egg cartons 73 and 75, and a further egg carton 76, disposed thereon. The figure shows the rotation table to have rotated 90° in the direction of the arrows so that the egg cartons are now oriented parallel to conveyor belts 14, 15, 42 and 43.

FIG. 9 is a fragmented plan view of rotation table assembly 40, taken from overhead, showing the mechanism by which the rotation of the rotation table, as described with respect to FIG. 8, is achieved. Referring to FIGS. 7 and 9, turntable 62 is mechanically affixed to a rotation axle 85, the rotation axle being mechanically affixed to a rotation arm 86. Rotation arm 86 is provided with a follower pin 87 which is slidably engaged in a slot 88 of a slotted arm 83. Slotted arm 83 is mechanically affixed to an armature 81 of an actuation mechanism 80. As indicated with respect to the above-identified actuation mechanisms, actuation mechanism 80 may be of a pneumatic, hydraulic, mechanical, or electro-mechanical type. As shown in FIG. 9, armature 81 is extended outwardly from actuation mechanism 80 so that turntable 62 is in its original position, prior to rotation. Thus, at this point, egg cartons 73, 75 and 76, shown in FIG. 8, would still be oriented transverse to the conveyor belts. However, as armature 81 is drawn into actuation mechanism 80 so as to be in a position shown in phantom in FIG. 9, rotation axle 85 is axially rotated by an angle of 90 degrees in the direction of the arrows, so as to correspondingly rotate the turntable and thereby orient egg cartons 73, 75 and 76 parallel to the secondary conveyor belts, as shown in FIG. 8. During such rotation, rotation table 62 is slidably supported by a lift table 90 which is in mechanical contact with armature 71 of actuation mechanism 70. It can be seen, therefore, that the lifting and rotating functions of rotation table assembly 40 are performed by respective ones of lifting table 90 and rotating table 62, and their associated mechanism. Turntable 62 is raised slightly by lift table 90 and actuation mechanism 70, prior to being rotated, to prevent interference with solenoid armatures 64a and 64b, and secondary conveyor belts 42 and 43, during rotation.

FIG. 10 shows rotation table 62 in a raised position so as to raise egg cartons 73, 75 and 76 above the level of the layer holders. As seen in the figure, the above-described rotation of the rotation table causes egg cartons 73, 75 and 76 to be stacked orthogonally to the orientation of prior egg carton layer 31. A pair of further egg cartons 78 and 79 are shown loaded onto elevator 20 and held in position by extended solenoid armatures 59a and 59b. Armature 59b is not shown in this figure.

FIG. 11 illustrates the manner in which a stack of egg cartons is removed form stacking zone 25. In this embodiment, unloading plate 51 is sufficiently large to apply a lateral force to the stack which is distributed to all of the layers in the stack. The stack is moved from stacking zone 25 to unloading zone 50 while turntable 62 is in a raised position. Unloading plate 51 is mechanically coupled to push rods 54 which, as shown in FIG. 2, may be provided with stops for preventing the egg carton from being moved too far leftward, and beyond the platform of unloading zone 50. As shown in FIG. 1, push rods 54 may extend through the machine so as to be operable either manually or by further mechanisms such as hydraulic cylinders 122 (FIGS. 6, 7 and 10).

The automatic article stacking system in accordance with the present invention may be used to stack 30-egg trays. Pursuant to this feature of the invention, hinged layer holders 67a, 67b, 67c and 67d are pivotably mounted to a generally rectangular frame member (not illustrated) by means of the respective hinge pins 68a, 68b, 68c and 68d. The frame member is removably mounted to a plurality of upright supports or posts 101 (see FIG. 13). In order to convert the automatic article stacking system to an operating mode in which 30-egg trays are handled, the frame which supports hinged layer holders 67a, 67b, 67c and 67d is removed from upright supports 101. A second rectangular frame 99 (see FIG. 12) to which four tray holders 67e, 67f, 67g and 67h are pivotably attached is positioned at the upper ends of upright supports 101. As illustrated in FIG. 12, rectangular frame 99 includes an outwardly extending flange 99a in the form of a planar picture frame. Flange 99a has a rectangular inner edge 99b to which is connected a rectangular extension 99c projecting in a direction perpendicular to the plane of flange 99a. Frame 99 can be manufactured from four angle members. As illustrated in FIG. 13, flange 99a rests on the upper ends of upright supports 101.

As illustrated in FIG. 13, a multiplicity of trays 102 may be arranged into stacks of, for example, six trays at stacking zone 25 by rotation table assembly 40. The trays 102 are advantageously stacked in angular orientations angularly staggered by 90° from one another. A computer control system (see FIG. 18) is informed that the operating mode is for trays rather than egg cartons by means of a selector switch.

In a case where the automatic article stacking system pursuant to the invention is used to stack 30-egg trays, sensor fingers may be provided at a monitoring station along the delivery path of the trays to check for missing eggs. The sensor fingers may be connected to a signal generator which produces a measurement signal indicative of the number of eggs in each tray. The measurement signal is used to determine which trays are stacked and which trays are ejected. In some applications, trays may be stacked without checking.

FIGS. 14, 15, 16 and 17 depict one method which may be used in loading stacked articles into a container or case 103. A discharge shelf 160, located at discharge zone or station 60, is provided with a first sheet metal (or plastic) overlay 192 juxtaposed to stacking zone 25 and a pair of second sheet metal (or plastic) overlays 193a and 193b at an end of the shelf spaced from stacking station 25. Sheet metal overlays 193a and 193b are spaced from sheet metal overlay 192 by a distance 104 and define therewith a channel or recess 105 for receiving a strip of plastic 194 such as mylar or other sheet material. In the region between sheet metal overlay 192 and overlays 193a and 193b, shelf 160 is provided with a pair of vacuum cups 191 connected by means of hoses 106 to a vacuum generator 107.

Prior to the removal of a stack of articles from stacking zone or station 25, plastic strip 194 is laid in the channel between overlays 192 and 193a and 193b, as illustrated in FIG. 15. The plastic strip is held in place by the suction from vacuum generator 107, communicated via hoses 106 and vacuum cups 191. The suction applied to plastic strip 194 enables a stack of cartons pushed from sheet metal overlay 192 to glide over the plastic strip without catching thereon.

Upon the positioning of a stack of articles on plastic strip 194, the strip is grasped by the ends and used as a sling to lower the stack into container 103 (see FIGS. 16). As shown in FIG. 17, strip 194 is easily withdrawn in the direction of arrow 108 and is available for use with a subsequent stack of articles. To facilitate the withdrawal of plastic strip 194 from between the stack of articles and container 103, the strip should have a high strength and a low coefficient of friction. Mylar has been found to be particularly suitable for this application.

The suction created by vacuum generator 107 need not be very great and is easily broken when the sling is lifted. The control system (see FIG. 18) may be programmed to detect signals from a vacuum switch 195 provided in hose 106 for sensing when the vacuum lock has been broken. The computer or control system prevents the pushing of a stack of articles from stacking zone 25 to loading zone 60 until a prior stack of articles has been removed.

Discharge zone 60 may be in the form of a chute or conveyor. A case with an open bottom could be lowered over the stack or, alternatively, one or more stacks could be pushed onto a tray and subsequently overwrapped.

As illustrated in FIG. 18, a control unit 109 for sequencing, coordinating and timing the operation of the separate components of an automatic article stacking system in accordance with the present invention is connected at a pair of inputs to photocells 17 and 19 and to a shaft encoder 110. Control unit 109 has output terminals connected to solenoids 56a, 56b, 58a, 58b, 63a and 63b for controlling the energization states thereof. Control unit 109 has additional output leads extending to actuators 26, 70 and 80 for operating those components. In addition, control unit 109 has output leads working into a carton-count register 111, a stack-count register 112, a width-count register 113, a belt-count register 114, a "busy" register 115 and a fifo stack 116. Registers 111-115 and stack 116 each have a respective output lead or multiple extending to control unit 109. Control unit 109, in one embodiment of the control system, takes the form of the central processing unit of a microprocessor 117. In this embodiment, registers 111-115, as well as fifo stack 116, are storage locations in the memory of microprocessor 117. This memory is represented in FIG. 18 by a block designated with reference numeral 130.

FIGS. 19A, 19B and 19C are a flow chart diagram which illustrates the operation of an automatic mechanical stacking system in accordance with the invention and, in particular, the operation of control unit or central processing unit 109. The sequence of operating steps begins at function block 200 which is identified as START. Upon being started, control unit 109 performs initialization functions 201 including clearing the contents of registers 111-115 and fifo stack 116 (FIG. 18). Upon completion of initialization 201, control unit 109 checks in a step 202 whether a change in signal level output of photoelectric device or photocell 19 has occurred. If a change in signal level corresponding to the blocking of photocell 19 has occurred, as determined at a decision junction 203, control unit 109 reads the width count at the top of fifo stack 116 in a step 204. As described hereinafter with respect to FIG. 19C, fifo stack 116 stores in binary form numerical values proportional to the width of each carton or tray located between photocell 17 and photocell 19 during the operation of the automatic stacking system. In step 204 the width count corresponding to the carton or tray which has just reached photocell 19 is extracted from stack 116. As a carton or tray passes photocell 17 its corresponding width count is loaded into the fifo stack.

The width count extracted from fifo stack 116 in step 204 is compared in a step 205 with a width-count limit for the selected type of a carton or tray. In executing step 205, control unit 109 determines whether the automatic stacking system is being operated in a carton mode or a tray mode, for example, by reading the output signal level of a selector switch, and then determines the width-count limit for the selected type of egg holder by, for example, reading the limit from a storage location in memory 130 (FIG. 18). If the width of the carton or tray which has just arrived at photocell 19 is less than or equal to a limiting value, as determined by control unit 109 at a decision junction 206, the control unit increments the carton count in register 111 in a step 207 by temporarily energizing a lead 118 connected to a stepping input of that register (see FIG. 18). Upon executing step 207, control unit 109 reads the contents of register 111 in a step 208 and compares, in a step 209, the extracted carton count with the number of cartons per layer in a selected type of carton or tray. Control unit 109 determines the number of cartons or trays per layer by, for example, first checking the output signal level of a switch or switches which are manually operable to indicate whether the automatic stacking machine is to be operated in a carton mode (12 eggs) or a tray mode (30 eggs) and then reads the respective number of cartons per layer from a preselected location in memory.

If the automatic stacking system is operating in tray mode, the outcome of comparison 209 will always be affirmative, as determined at a decision junction 210, while if the automatic stacking system is operating in a carton mode, an affirmative or positive outcome at decision junction 210 will result only if three cartons have been counted by register 111 and collected in elevator 20. If the carton count is equal to the number of cartons or trays per layer, control unit 109 loads, in a step 211, an encoded distance X into belt-count register 114 via a multiple 119 (see FIG. 18). The distance X is the distance between photocell 19 and turntable 40. Control unit 109 then resets carton-count register 111 in a step 212 by temporarily energizing a lead 120. Control unit 109, in a step 213, subsequently lowers plungers 59a and 59b of solenoids 58a and 58b.

If at decision junction 210 control unit 109 finds that the carton count in register 111 is less than the number of cartons per layer for the selected type of carton or tray, the control unit, in a step 214, ensures that plungers 59a and 59b are in a raised position.

If at decision junction 206 control unit 109 determines that the width of a carton or tray which has arrived at photocell 19 is greater than a predetermined limiting value, control unit 109 loads an encoded distance Y into belt-count register 114 in a step 215. In a subsequent step 216, control unit 109 reads the contents of carton-count register 111. If control unit 109 determines at a decision junction 217 that the contents of carton-count register 111 are equal to zero, indicating that no cartons have been deposited on elevator 20, the control unit lowers plungers 59a, 59b, 64a and 64b in a step 219. If cartons have been deposited on elevator 20, as determined by control unit 109 at decision junction 217, the control unit energizes actuator 80 in a step 218 to lift the elevator and thereby remove the deposited cartons from the path between photocell 19 and stacking station 25. Plungers 59a, 59b, 64a and 64b are then lowered in step 219.

If at decision junction 203 control unit 109 discovers that photocell 19 has not been newly blocked during the last operating cycle of microprocessor 117, the control unit checks, in a step 220, the state of plungers 59a and 59b. If in an inquiry 221 it is discovered that plungers 59a and 59b are in a lowered position, control unit 109 checks in a step 223 whether a change in the signal level output of photocell 19 has occurred. If a carton has just passed photocell 19, as determined at a decision junction 224, plungers 57a and 57b are raised by control unit 109 in a step 225. Control unit 109 then accesses in a step 226 the contents of belt-count register 114. If the contents of this register are equal to zero, as determined at a decision junction 227, plungers 64a and 64b are raised in a step 228, while plungers 57a and 57b and elevator 21 are lowered. Control unit 109 then reads the contents of carton-count register 111 in a step 229. In a subsequent step 230, the contents of carton-count register 111 are compared with the number of cartons per layer for the selected type of carton or tray. If the outcome of comparison 230 is positive, as determined at a decision junction 231, control unit 109 executes step 213, lowering plungers 59a and 59b. If, however, the number of cartons in elevator 20 has not yet reached the number of cartons per layer for the selected operating mode of the automatic stacking system, control unit 109 ensures in a step 232 that plungers 59a and 59b are in a raised position.

If at decision junction 224 control unit 109 determines that no carton has just passed photocell 19, steps 226-231 are executed as heretofore described. If control unit 109 determines at decision junction 221 that plungers 59a and 59b are in a raised position, steps 229-231 are performed.

Upon the execution of step 213, control unit 109 reads in a step 231 the contents of "busy" register 115 and compares in a step 234 the contents of that register with zero. If the contents are zero, as determined at a decision junction 235, control unit 109 reads the contents of belt-count register 114 in a step 236. The belt-count register contents are compared in a step 237 with zero. If those contents are equal to zero, as discovered by control unit 109 at a decision junction 238, the control unit energizes actuator 70 in a step 239 to lift the turntable. In a subsequent step 240, control unit 109 increments the contents of stack-count register 112 by temporarily energizing a lead 121 connected to the stepping input of stack-count register 112 (FIG. 18). Control unit 109 then reads the contents of stack-count register 112 in a step 241. If the contents are an even number, as determined by control unit 109 at a decision junction 242, the control unit energizes actuator 80 in a step 243 to rotate turntable through 90°.

If the contents of "busy" register 115 are not equal to zero, as determined at decision junction 235, or if the contents of stack-count register 112 are not an even number, as determined at decision junction 242, control unit 190 loads a high logic level signal (i.e., a "1") into "busy" register 115 in a step 244. This step is also performed upon the energization of actuator 80 in step 243. The control unit then checks, in a step 245, the progress of the turntable along a vertical path. Upon the attainment by the turntable of the top of its stroke, as discovered by control unit 109 at a decision junction 246, the contents of stack-count register 112 are read in a step 247 and compared, in a step 248, with an encoded number representing the number of layers in a completed stack. If a completed stack has been formed, corresponding to an affirmative answer to an inquiry 249, control unit 109 energizes an actuator 122 (see FIGS. 6, 7 and 10) in a step 250 to laterally shift unloading plate 51 and thereby move the completed stack out of the stacking zone 25.

In a step 251, control unit 109 checks the progress of stack pusher 51 along its horizontal path. Upon the completion of the horizontal stroke of stack pusher 51, detected by control unit 109 at an inquiry 252, the control unit reverses the motion of stack pusher 51 in a step 253. In a subsequent step 254, control unit 109 resets stack-count register 112 by temporarily energizing a lead 123 extending to the resetting input of that register.

If control unit 109 finds at decision junction 249 that the stack located in the stacking zone 25 is incomplete, control unit 109 deenergizes actuator 70 in a step 255 to lower the turntable. Step 255 is also executed upon the resetting of stack-count register 112 in step 254. In a subsequent step 256, actuator 80 is deenergized to counter-rotate the turntable by 90°. In the event that the contents of stack-count register 112 were an odd number, i.e., in the event that the turntable was not rotated during the last upward stroke thereof, the deenergization step 256 is ineffective to rotate the turntable. "Busy" register 115 is reset in a step 257, while plungers 57a and 57b are lowered in a subsequent step 258.

As illustrated in FIG. 19C, upon the completion of the operations in steps 214, 219 and 232 in FIG. 19A, upon the completion of step 258 in FIG. 19B, upon a negative outcome to the inquiry at decision junction 227 in FIG. 19A and upon negative outcomes to the inquiries at decision junctions 238 ant 246 in FIG. 19B, control unit 109 checks in a step 259 whether a change in signal level output of shaft encoder 110 (FIG. 18) has occurred since the signal level was checked in the previously operating cycle of control unit 109. If the control unit discovers at a decision junction 260 that a new tooth of a gear has been juxtaposed to the shaft encoder, the contents of belt-count register 114 are decremented in a step 261 by the energization of a lead 124 extending to a decrementing input of the belt-count register 114. In a subsequent step 262, the control unit checks the signal from photocell 17 and determines at a decision junction 263 whether the photocell is currently blocked by a carton or tray. If the photocell is blocked, the control unit increments, in a step 268, the contents of width-count register 113 by temporarily energizing a lead 125 extending to the stepping input of that register (see FIG. 18). If photocell 17 is not blocked, as determined at decision junction 263, control unit 109 reads in a step 264 the contents of the width-count register. If the contents are greater than two, as discovered by the control unit at a decision junction 265, control unit 109 transfers the contents of the width-count register 113 to the bottom of fifo stack 116 in a step 266. Upon the transfer of the width count to the fifo stack, or upon the discovery at decision junction 265 that the contents of width-count register 113 do not exceed two, width-count register 113 is reset in a step 267 by the generation of a pulse on a resetting lead 126 extending to that register.

Upon the discovery at decision junction 260 that the time to decrement the contents of belt-count register 114 has not yet arrived, upon the resetting of width-count register 113 in step 267 or upon the incrementation of the contents of register 113, control unit 109 returns to the beginning of the operating cycle, i.e., to step 202 in FIG. 19A.

It is to be noted that during each cycle of operation of control unit 109 or microprocessor 117, the output signal level of shaft encoder 110 is checked. Upon the detection of a new tooth by shaft encoder 110, the contents of belt-count register 114 are decremented (step 261) and, if photocell 17 is blocked by a carton or tray on conveyor belts 14 and 15 (step 262 and decision junction 263), a stepping pulse is transmitted from control unit 109 to width-count register 113 to increment the contents thereof.

Preferably, photocell 17 is located several feet upstream from photocell 19 in order to provide surge capacity. Each carton between the photocells has its width count position in the stack.

In monitoring the output signal levels of photocells 17 and 19, control unit 109 responds to the passage of a leading or a trailing edge of a carton or tray by the respective photocell. In steps 201-206, photocell 19 is checked for the leading edge of a carton or tray just entering and breaking a light beam. Upon the breaking of the beam by the leading edge of a carton or tray, the width count corresponding to that carton or tray is extracted from fifo stack 116 and checked for excessive width. If the lid of the egg carton is properly closed, the width count will be within predetermined limits, in which case the carton-count register 111 is incremented (step 207).

It is to be noted that solenoids 58a and 58b, as well as solenoids 56a and 56b and solenoids 63a and 63b, may be designed so that their respective plungers are normally in a raised position, e.g., by means of restoring springs. In this case, the execution of steps 214 and 232 (FIG. 19A) may in some instances be redundant. However, the steps are nevertheless performed as a double check to ensure that the plungers are in the correct position.

Encoded distance Y loaded into belt-count register 114 in step 215 (FIG. 19A) represents the count-down necessary for a carton to travel from photocell 19 to a point past plungers 64a and 64b. During the travel of a rejected carton past elevator 20 and stacking zone 25, actuator 80 is energized to lift elevator 20 if it is discovered that cartons are located thereon (decision junction 217).

During the travel of a carton or tray from photocell 19 to or past stacking zone 25, control unit 109 raises plungers 57a and 57b (step 225) upon detecting that a trailing edge of a carton or tray has just gone pass photocell 19 (step 223 and decision junction 224). In their raised positions plungers 57a and 57b hold following cartons just upstream of photocell 19. When the last carton or tray to pass photocell 19 has attained the goal of its horizontal travel, i.e., has reached turntable 40 or, in the case of a rejected carton or tray, has passed turntable 40, the automatic stacking system is returned to a condition for loading cartons onto elevator 20 (see step 228).

FIG. 19B shows the steps undertaken by control unit 109 in initiating, monitoring and terminating operations for placing a set of cartons or a tray into a stack in the stacking zone. Provided that the turntable is not already lifting a set of cartons or a tray to the stack, as determined by the contents of "busy" register 115, control unit 109 energizes actuator 70 to lift the turntable and increments the contents of stack-count register 112 upon the attainment of the cartons or tray of the turntable location. The turntable is rotated for even layers in the stack of articles (see decision junction 242 and step 243). Upon the completion of the vertical stroke of the turntable, as detected, for example, by a sensor (not illustrated) at the top of the turntable path or, alternatively, as determined by a timing device (not illustrated) in microprocessor 117, and upon the completion of a stack of articles, control unit 109 induces the shifting of the stack laterally out of the stacking zone (step 250).

Although the invention herein has been described in terms of specific embodiments and applications, persons skilled in the art can, in light of this teaching, generate additional embodiments for other applications without departing from the spirit or exceeding the scope of the claims. For example, persons skilled in the art can generate embodiments of the invention wherein the characteristic of each article which is measured or detected to determine whether a particular article is acceptable for stacking is not a lengthwise measurement. Such a determinative measurement may be a distance measurement in another dimension, the weight of the article, the color of the article, the translucence of the article, or the effect of the article upon electrical magnetic fields. Accordingly, the drawings and descriptions herein should be construed as merely illustrative of the invention, and not in a limiting sense.

What is claimed is:

1. A system for stacking a plurality of articles in a predetermined arrangement, the system being of the type which is provided with a conveyor which moves the articles along a predetermined conveyor path, the system being characterized in that there are further provided:

measurement means for producing a measurement information signal having a first signal state when an article to be stacked has a length in the direction of the predetermined conveyor path which is less than a predetermined threshold length value, and a second signal state when said article has a length which is greater than said predetermined threshold length value;

elevator means having first and second elevator positions responsive to said measurement information signal, said elevator means being in said first elevator position for accumulating therein a predetermined number of the articles, and in said second elevator position for permitting the articles to be conveyed past said elevator means; and rotative stacking means for receiving said predetermined number of the articles accumulated in said elevator means, said predetermined number of accumulated articles forming a layer of articles to be stacked, said layer of articles being deposited in a stacking zone in a selectable rotative orientation.

2. The system of claim 1 wherein said measurement means further comprises:

sensing means disposed at a predetermined location near the predetermined conveyor path for producing a detection signal during such time as each of the articles is conveyed near said predetermined location; and conveyor distance measuring means for producing a distance signal responsive to said detection signal, said distance signal corresponding to the length of said article to be stacked, said length being measured along the direction of the predetermined conveyor path.

3. The system of claim 2 wherein said measurement means further comprises:

memory means for storing a signal value corresponding to said predetermined threshold length value; and comparator means for producing said measurement information signal in response to said length signal and said predetermined threshold length value contained in said memory means.

4. The system of claim 1 wherein said rotative stacking means further comprises:

turntable means having a major plane arranged substantially parallel to the predetermined conveyor path, said layer of articles to be stacked being disposed on said turntable means;

rotator means for rotating said turntable means in said major plane and rotating said layer of articles by a predetermined angular segment; and lift means for lifting said turntable means in a direction substantially orthogonal to said major plane.

5. The system of claim 4 wherein said rotator means for rotating said turntable means further comprises:

rotator shaft means mechanically coupled to said turntable means, said rotator shaft means having a longitudinal central axis orthogonal to said major plane and coincidental with an axis of rotation of said turntable means; and means for rotating said rotator shaft by said predetermined angular segment.

6. The system of claim 5 wherein said means for rotating said rotator shaft comprises:
lever arm means mechanically coupled to said rotator shaft means and arranged substantially orthogonal to said longitudinal central axis; and
rotative actuation means mechanically coupled to said lever arm means for rotatively moving said lever arm means by said predetermined angular segment.

7. The system of claim 6 wherein said rotative actuation means comprises a linearly moving armature having a slotted arm mechanically affixed at a distal end thereof, said slotted arm being slidably coupled with said lever arm means.

8. The system of claim 5 wherein said lift means comprises:
lift table means slidably coupled with said turntable means; and
lift actuation means for moving said lift table means in a direction parallel to said longitudinal central axis of said rotator shaft means.

9. The system of claim 8 wherein said lift actuation means comprises a linear armature mechanically coupled to said lift table means.

10. The system of claim 4 wherein there is further provided article holding means disposed in said stacking zone for receiving and holding said layer of articles to be stacked from said turntable means, when said turntable means is lifted by a predetermined distance.

11. The system of claim 10 wherein said article holding means comprises a plurality of hinged members arranged in a rectangular configuration for permitting said layer of articles to be stacked to pass therethrough when said turntable means is lifted by said predetermined distance, and holding said layer of articles when said turntable means is returned to a lowered position.

12. The system of claim 1 wherein there is further provided first means for restraining the articles from being conveyed along the predetermined conveyor path in response to said measurement information signal.

13. The system of claim 12 wherein said first means for restraining comprises a solenoid having a solenoid armature, said solenoid armature being extended from said solenoid so as to restrain the articles from being conveyed along the predetermined conveyor path, in response to said second signal state of said measurement information signal.

14. The system of claim 1 wherein there is further provided second means for restraining the articles from being conveyed long the predetermined conveyor path, said second means for restraining being arranged past said elevator means along the predetermined conveyor path.

15. The system of claim 1 wherein there is further provided third means for restraining the articles from being conveyed along the predetermined conveyor path, said third means for restraining being arranged past said rotative stacking means along the predetermined conveyor path.

16. The system of claim 1 wherein said elevator means comprises:
first and second L-shaped elevator structures for receiving and accumulating the articles; and
elevator actuation means for raising said L-shaped elevator structures in response to said measurement information signal.

17. The system of claim 1 wherein there is further provided means for restraining the articles from being conveyed along the predetermined conveyor path in response to said measurement information signal.

18. A system for stacking a plurality of egg cartons in a predetermined arrangement, the system comprising:
conveyor means for receiving and transporting the egg cartons through the system along a predetermined conveyance path;
accumulator means having released and unreleased states for restraining the egg cartons from being transported along the predetermined conveyance path and accumulating on said conveyance means a predetermined number of the egg cartons in side-by-side relationship during said unreleased state;
measurement means for producing a plurality of measurement signals, each measurement signal being responsive to a predetermined characteristic of a respective one of the egg cartons; and
bypass means for temporarily removing from said conveyor means accumulated ones of the egg cartons in response to a deviant one of said measurement signals and thereby allowing a deviant egg carton associated with said deviant measurement signal to be transported by said conveyor means past said bypass and said accumulator means.

19. The system of claim 18 wherein there is further provided:
sensor means for producing a sensor signal responsive to said transportation of said deviant egg carton past a predetermined point along said predetermined conveyance path beyond said bypass means; and
means responsive to said sensor signal for causing said bypass means to replace said accumulated ones of the egg cartons onto said conveyor means, said accumulated egg cartons being prevented from further transportation via said conveyor means by said accumulator means in said unreleased state.

20. The system of claim 18 or 19 wherein there is further provided:
carton counter means for counting the egg cartons accumulated at said accumulator means and producing a count signal responsive to said predetermined number of accumulated egg cartons;
loading means for stacking said predetermined number of egg cartons as a layer of egg cartons; and
means responsive to said count signal for causing said accumulator means to enter a released state and thereby allow said layer of egg cartons to be transported onto said loading means.

21. The sytem of claim 20 wherein said loading means comprises rotator means for rotating said layer of egg cartons prior to stacking.

22. The system of claim 21 wherein there is further provided layer holding means for receiving said layer of egg cartons from said loading means.

23. A method for stacking articles, the method comprising the steps of:
loading the articles onto a conveyor system which will transport the articles along a predetermined path;
measuring a predetermined parameter of each of the articles and producing a measurement signal responsive to said measured parameter for each article, said measurement signal being within a first value range for acceptable articles and within a second value range for unacceptable articles;

accumulating acceptable ones of the articles, in response to said measurement signal being within said first value range, at a bypass station;

removing said accumulated articles from said conveyor system prior to accumulation of an unacceptable article, in response to said associated measurement signal being within said second value range, by operating said bypass station;

transporting said unacceptable article via said conveyor system to a discharge area;

replacing said accumulated articles on said conveyor system after said unacceptable article has been transported beyond said bypass station, at least a further one of the acceptable articles being accumulated at said bypass station until a predetermined number of articles are accumulated; and transporting the predetermined number of accumulated acceptable articles to a stacking mechanism which is at a first level corresponding to the level of said conveyor system.

24. The method of claim 23 wherein there are provided the further steps of:

rotating said predetermined number of accumulated acceptable articles by a predetermined amount;

raising said rotated articles to a second level corresponding to the level of a stacking zone where the predetermined number of articles are held as a layer of a stack; and removing a stack of the articles from said stacking zone after a predetermined number of layers are held at said stacking zone.

25. The method of claim 24 wherein there are provided the further steps of:

blocking subsequently loaded ones of the articles from being transported to the location of said bypass station while said unacceptable article is being transported to said discharge area; and blocking subsequently loaded ones of the articles which are accumulated at said bypass station from being transported to said stacking mechanism while said stacking mechanism is rotating previously accumulated articles and raising said rotated articles to said stacking zone.

26. The method of claim 25 wherein there are provided the further steps of:

blocking subsequently loaded ones of the unacceptable articles from being accumulated at said bypass station; and returning said stacking mechanism to said first level.

27. A system for stacking a plurality of articles in a predetermined configuration, comprising:

conveyor means for moving the articles along a predetermined conveyor path;

turntable means in said predetermined conveyor path for receiving articles to be stacked from said conveyor means, said turntable means having a major plane arranged substantially parallel to the predetermined conveyor path;

rotator means operatively connected to said turntable means for rotating same in said major plane through a predetermined angle, whereby adjacent layers of articles received from said conveyor means may be oriented at an angle with respect to one another, said rotator means including rotator shaft means fixed to said turntable means, said rotator shaft means having a longitudinal central axis orthogonal to said major plane and coincidental with an axis of rotation of said turntable means, said rotator means further including lever arm means mechanically coupled to said rotator shaft means and arranged substantially orthogonal to said longitudinal central axis and rotative actuation means mechanically coupled to said lever arm means for rotatively moving said lever arm means by said predetermined angular segment; and lift means operatively linked to said turntable means for lifting same in a direction substantially orthogonal to said major plane, said lift means including a lift table separate from and in slidable engagement with said turntable means, said lift means further including lift actuation means, said lift means and said lift actuation means being separate from said rotator means for moving said lift table in a direction substantially perpendicular to said major plane.

28. The system of claim 27 wherein said rotative actuation means comprises a linearly moving armature having a slotted arm mechanically affixed at a distal end thereof, said slotted arm being slidably coupled with said lever arm means.

29. The system of claim 27 wherein said lift actuation means comprises a linear armature mechanically coupled to said lift table means.

30. The system of claim 27 wherein there is further provided article holding means disposed in said stacking zone for receiving and holding said layer of articles to be stacked from said turntable means, when said turntable means is lifted by a predetermined distance.

31. The system of claim 30 wherein said article holding means comprises a plurality of hinged members arranged in a rectangular configuration for permitting said layer of articles to be stacked to pass therethrough when said turntable means is lifted by said predetermined distance, and holding said layer of articles when said turntable means is returned to a lowered position.

32. A system for stacking a plurality of egg cartons in a predetermined arrangement the system comprising:

conveyor means for receiving and transporting the egg cartons through the system along a predetermined conveyance path;

accumulator means having released and unreleased states for preventing transportation of the egg cartons and accumulating a predetermined number of the egg cartons during said unreleased state;

measurement means for producing a plurality of measurement signals, each measurement signal being responsive to a predetermined characteristic of a respective one of the egg cartons;

bypass means for removing from said conveyor means accumulated ones of the egg cartons in response to a deviant one of said measurement signals and thereby allowing a deviant egg cartons associated with said deviant measurement signal to be transported by said conveyor means past said bypass and said accumulator means;

sensor means for producing a sensor signal responsive to said transportation of said deviant egg carton past a predetermined point along said predetermined conveyance path beyond said bypass means; and means responsive to said sensor signal for causing said bypass means to replace said accumulated ones of the egg cartons onto said conveyor means, said accumulated egg cartons being prevented from further transportation via said conveyor means by said accumulator means in said unreleased state.

33. A system for stacking a plurality of egg cartons in a predetermined arrangement the system comprising:
conveyor means for receiving and transporting the egg cartons through the system along a predetermined conveyance path;
accumulator means having released and unreleased states for preventing transportation of the egg cartons and accumulating a predetermined number of the egg cartons during said unreleased state;
measurement means for producing a plurality of measurement signals, each measurement signal being responsive to a predetermined characteristic of a respective one of the egg cartons;
bypass means for removing from said conveyor means accumulated ones of the egg cartons in response to a deviant one of said measurement signals and thereby allowing a deviant egg carton associated with said deviant measurement signal to be transported by said conveyor means past said bypass and said accumulator means;
carton counter means for counting the egg cartons accumulated at said accumulator means and producing a count signal responsive to said predetermined number of accumulated egg cartons;
loading means for stacking said predetermined number of egg cartons as a layer of egg cartons; and
means responsive to said count signal for causing said accumulator means to enter a released state and thereby allow said layer of egg cartons to be transported onto said loading means.

34. The system of claim 33 wherein said loading means comprises rotator means for rotating said layer of egg cartons prior to stacking.

35. The system of claim 34 wherein there is further provided layer holding means for receiving said layer of egg cartons from said loading means.

* * * * *